J. A. HARRIS & A. W. HOWARD.
AGRICULTURAL IMPLEMENT.
APPLICATION FILED FEB. 3, 1917.
1,235,795.
Patented Aug. 7, 1917.
2 SHEETS—SHEET 2.
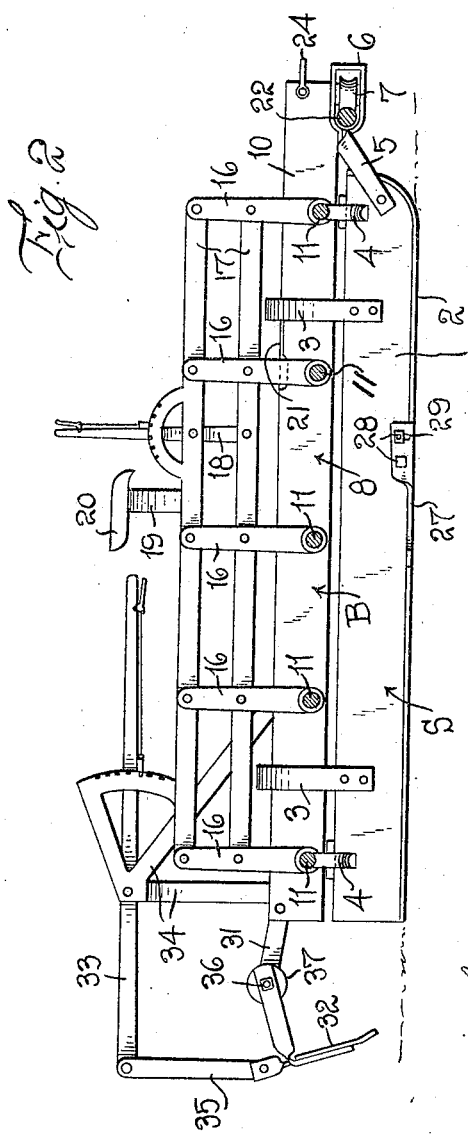
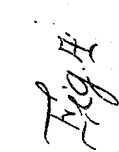
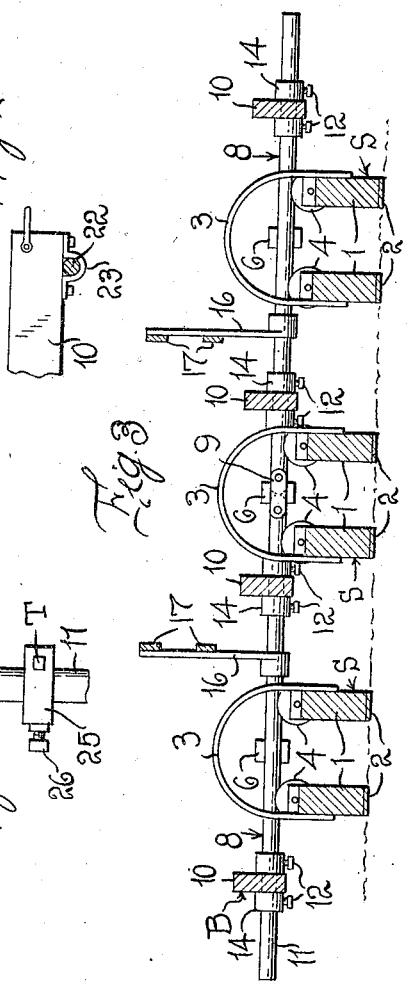
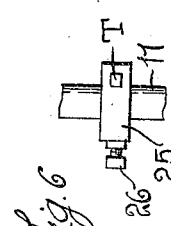
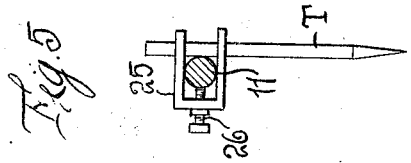
Inventors
JOSEPH A. HARRIS
ARTHUR W. HOWARD
By Watson E. Coleman
Attorney

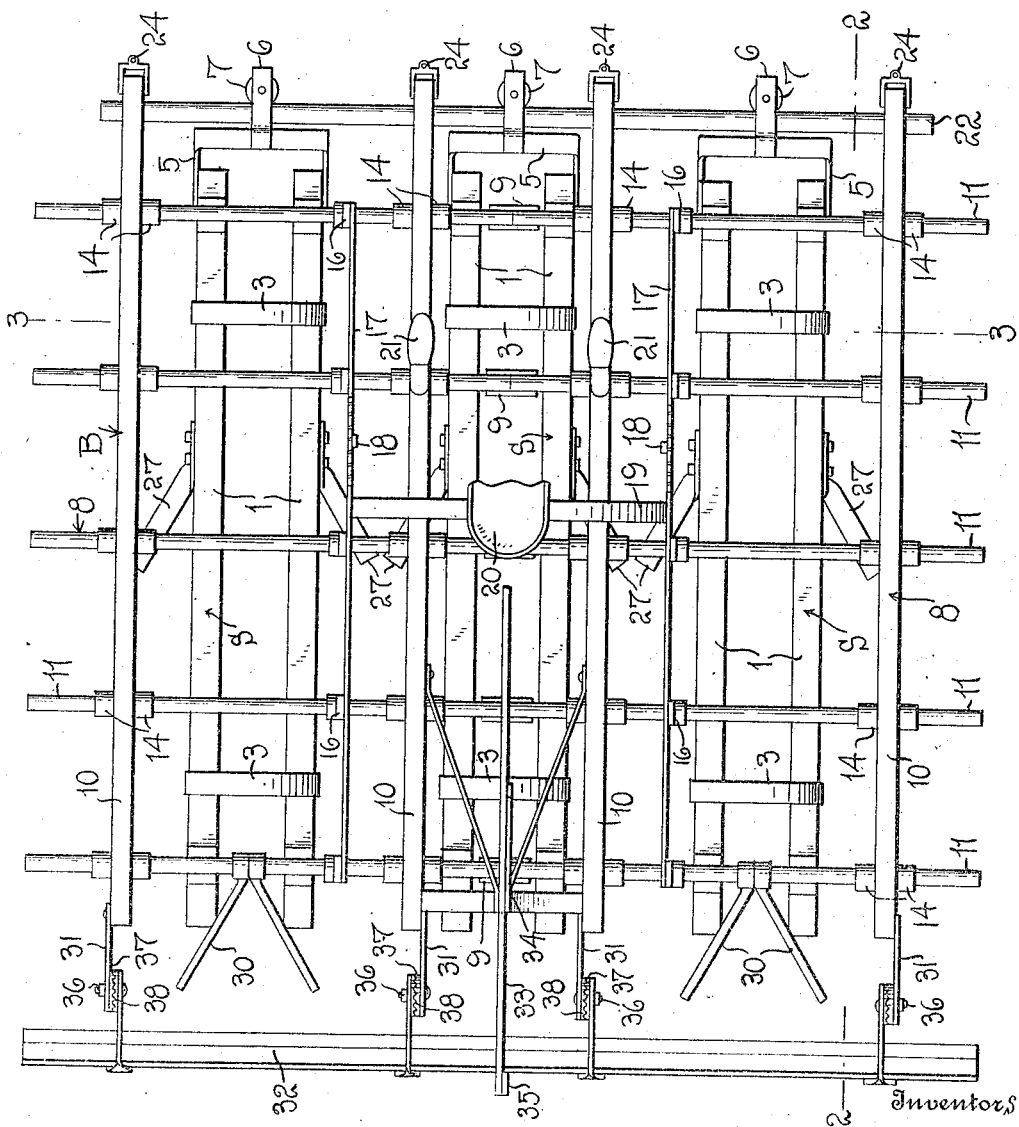

UNITED STATES PATENT OFFICE.

JOSEPH A. HARRIS, OF CHILDRESS, AND ARTHUR W. HOWARD, OF CLARENDON, TEXAS.

AGRICULTURAL IMPLEMENT.

1,235,795.  Specification of Letters Patent.  Patented Aug. 7, 1917.

Application filed February 3, 1917. Serial No. 146,436.

*To all whom it may concern:*

Be it known that we, JOSEPH A. HARRIS and ARTHUR W. HOWARD, citizens of the United States, residing at Childress and Clarendon, respectively, in the county of Childress and Donley, resp., and State of Texas, have invented certain new and useful Improvements in Agricultural Implements, of which the following is a specification, reference being had to the accompanying drawings.

This invention relates to certain improvements in agricultural implements and has relation more particularly to a device of this general character of a drag type; and it is an object of the invention to provide a novel and improved implement which is capable of a multiplicity of uses.

It is also an object of the invention to provide a novel and improved implement of this general character including a plurality of supporting members provided with ground working elements together with a body positioned upon said supporting members and wherein said supporting members and body are capable of relative movement transversely of the direction of travel of the implement.

The invention has for a still further object to provide a device of this general character comprising a plurality of supporting members and a body rested thereon and wherein said body is capable of detachment from the supporting members for separate and independent use.

The invention consists in the details of construction and in the combination and arrangement of the several parts of our improved implement whereby certain important advantages are attained and the device is rendered simpler, less expensive and otherwise more convenient and advantageous for use, all as will be hereinafter more fully set forth.

The novel features of the invention will hereinafter be definitely claimed.

In order that our invention may be the better understood, we will now proceed to describe the same with reference to the accompanying drawings, wherein—

Figure 1 is a view in top plan of an agricultural implement constructed in accordance with an embodiment of our invention, the harrow teeth being omitted for clearness in disclosure;

Fig. 2 is a sectional view taken substantially on the line 2—2 of Fig. 1, the harrow teeth and plow supporting arms being omitted for clarity in disclosure;

Fig. 3 is a sectional view taken substantially on the line 3—3 of Fig. 1, the harrow teeth being also omitted for clearness in disclosure;

Fig. 4 is a fragmentary view partly in elevation and partly in section illustrating certain features of the invention as herein embodied;

Fig. 5 is a view partly in elevation and partly in section illustrating the mounting of a harrow tooth as herein included; and Fig. 6 is a fragmentary view in top plan of the construction as disclosed in Fig. 5.

As disclosed in the accompanying drawings, S denotes a plurality of supporting members and each of said supporting members consists of two elongated parallel members 1 of predetermined dimensions and which have their under surfaces provided with the metallic runners 2 whereby said supporting member may be readily and conveniently drawn over the surface of the ground.

The elongated members 1 are maintained in predetermined spaced relation through the medium of the upstanding rigid arches 3. The opposite end portions of the elongated members 1 are provided with the grooved rollers 4 rotating about axes disposed longitudinally of said elongated members and which are adapted for a purpose which will hereinafter be more fully explained.

Pivotally engaged with the forward ends of the elongated members 1 and adapted for rocking movement in a vertical direction, is a bail or yoke 5 provided at substantially its center with the forwardly directed rigid loop or frame 6 in which is mounted for rotation about a vertical axis a grooved roller 7 for a purpose which will also be hereinafter more particularly set forth.

B denotes a body adapted to be rested upon the supporting members S and as herein set forth the body B comprises a plurality of sections 8 having adjacent portions pivotally or hingedly connected one to the other, as indicated at 9.

Each of the sections 8 comprises two parallel beams 10 adapted to extend longitudinally of the supporting members S when the body B is in applied position on said supporting members and 11 denotes a plurality of cross members disposed through the beams 10 and capable of rocking movement. Each of the cross members 11 is preferably circular in form and has affixed thereto at opposite sides of each of the beams 10 and through the medium of the clamping nuts 12, the sleeves or collars 14 whereby it will be at once self-evident that the cross members 11 are held against endwise movement when in applied position and whereby said members may be readily and conveniently assembled or removed when the requirements of practice may so necessitate.

Each of the cross members 11 is provided with an upstanding rock arm 16. Pivotally engaged with each of the rock arms and common thereto are the parallel vertically spaced rods 17 whereby it will be perceived that said rock arms will be caused to move in the same general direction and to the same extent.

Pivotally engaged with the rods 17 is the vertically directed lever 18 affording an effective means whereby the cross members 11 may be readily rocked as the requirements of practice may dictate.

The upper rods 17 are connected by the yoke or frame 19 the central portion whereof has suitably affixed thereto a seat 20. It is to be noted that the levers 18 are so positioned relative to the seat 20 as to be readily grasped by the operator. The inner beams 10 of each of the sections 8 of the body B are provided with the foot rests 21 suitably positioned relatively to the seat 20.

When in applied position the end cross members 11 are adapted to rest upon the grooved rollers 4 carried by the supporting members S, and extending through the rigid loops or frames 6 rearwardly of the rollers 7 is the rod 22 detachably engaged, as at 23, with the under portions of the beams 10 adjacent the forward ends thereof, whereby it will be perceived that the members S and the body B may be caused to travel in unison when drafting means are hitched to the forward ends of the beams 10. As herein disclosed, the forward end portions of the beams 10 are provided with the clevises 24 or the like to which is adapted to be suitably connected an evener preferably of a four-horse type, although it is to be understood that other means for transporting the implement may be used instead of draft animals.

By displacing the rod 22 it will be at once self-evident that the body B may be removed from the supporting members S so that said body B may be employed as a drag harrow.

In order to permit the body B to be employed as a drag harrow the cross members 11 are provided with the teeth T. Each of the teeth T is detachably secured to a cross member 11 through the medium of the U-shaped member 25 which straddles a cross member and has a tooth T disposed through the free end portions of said member at a point preferably in advance of said member 11. The intermediate portion of the member 25 has threaded therethrough the binding screw 26 which is adapted to coact with the rear face of the member 11, whereby it will be at once perceived that the tooth T may be readily and effectively applied to a cross member or removed therefrom. It will be self-evident that the slant of the teeth T can be readily and effectively controlled by rocking the cross members 11 through the medium of the levers 18 hereinbefore referred to.

Secured to the outer faces of each of the elongated members 1 are the cultivating blades 27 disposed on a predetermined incline. In practice the members 1 of each of the supporting members S are adapted to be arranged at opposite sides of a row whereby it will be perceived that an effective working of the soil is assured.

The rollers 4 and 7 hereinbefore referred to permit relative movement between the supporting members S and the body B whereby the supporting members S may be readily adjusted in accordance with the spacing of the rows.

As herein disclosed, each of the blades 27 is attached to a member 1 through the medium of two bolts 28, said blade being provided with an elongated slot 29 through which the forward bolt 28 is disposed so that the vertical angle of said blade may be readily regulated.

Extending rearwardly from and suitably secured to the rear cross members 11 of each of the sections 8 of the body B are the arms 30 to which are adapted to be engaged suitable cultivating shovels (not shown).

Pivotally engaged with the rear end portions of the beams 10 are the arms 31 which support the ground working blade 32 of a length substantially equal to the width of the body B, and said blade 32 is adapted to be raised or vertically adjusted through the medium of the lever 33 pivotally supported by the members 34 carried by the inner or opposed beams 10 of the sections 8. The rear or outer end of the lever 33 is operatively engaged with the blade 32 at substantially its longitudinal center through the medium of the rigid link 35. The lever 33 is also of such a length as to have its inner end terminate in close proximity to the seat 20 whereby the blade may be readily adjusted by the operator.

In order that the angle of the blade 32 may be readily adjusted relative to the ground surface as necessitated by practice, we find it of advantage to form each of the arms 31 of two sections with the adjacent ends of said sections in overlying relation and pivotally connected by the clamping bolt 36. The overlying portions of the sections of the arm are provided with the substantially circular enlargements 37, the opposed faces of which being provided with the radial teeth 38 adapted to intermesh whereby it will be at once self-evident that the blade 32 will be effectively maintained in its requisite angular adjustment.

From the foregoing description, it is thought to be obvious that an implement constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice, except as hereinafter claimed.

We claim:

1. A device of the character described comprising a plurality of supporting members, a body resting upon said supporting members, said body and supporting members being capable of relative independent movement, coacting means carried by the supporting members and the body for causing the same to travel in unison in one direction, said body being provided with hitching means, and ground working elements carried by the supporting members and the body.

2. A device of the character described comprising a plurality of supporting members, each of said supporting members having its upper surface provided with rollers rotating about axes disposed longitudinally of the supporting member, a body resting upon the supporting members and including cross members engageable with the rollers of the supporting members whereby said body and supporting members are capable of independent relative movement, and ground working elements carried by the supporting members and the body.

3. A structure as specified in claim 1, wherein each of said supporting members is adapted to straddle a row.

4. A structure as specified in claim 1, wherein each of said supporting members comprises two elongated parallel members, and means for maintaining said parallel members in predetermined spaced relation.

5. A structure as specified in claim 1, wherein the coacting means is carried by the forward ends of the supporting members and the body and the hitching means by the forward ends of the body.

6. A structure as specified in claim 5, wherein said coacting hitching means includes a removable rod carried by the forward end of the body, and a yoke carried by the forward end of each of the supporting members and provided with a loop through which the rod is loosely directed.

7. In a structure as specified in claim 6, a roller rotatably mounted within each of the loops about a vertical axis and positioned in advance of the rod.

In testimony whereof we hereunto affix our signatures in the presence of two witnesses.

JOSEPH A. HARRIS.
ARTHUR W. HOWARD.

Witnesses:
J. M. FRANKLIN,
A. M. BEVILLE.

Copies of this patent may be obtained for five cents each, by addressing the "Commissioner of Patents, Washington, D. C."